United States Patent
Schulz et al.

(10) Patent No.: US 9,550,514 B2
(45) Date of Patent: Jan. 24, 2017

(54) RETRACTABLE STEERING COLUMN SYSTEM WITH AIR BAG, VEHICLE HAVING THE SAME, AND METHOD

(71) Applicant: STEERING SOLUTIONS IP HOLDING CORPORATION, Saginaw, MI (US)

(72) Inventors: John F. Schulz, Hemlock, MI (US); Joen C. Bodtker, Gaines, MI (US); Richard K. Riefe, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/184,311

(22) Filed: Jun. 16, 2016

(65) Prior Publication Data
US 2016/0375927 A1 Dec. 29, 2016

Related U.S. Application Data

(60) Provisional application No. 62/184,357, filed on Jun. 25, 2015.

(51) Int. Cl.
| | |
|---|---|
| *B60R 21/203* | (2006.01) |
| *B62D 1/183* | (2006.01) |
| *B60R 21/264* | (2006.01) |
| *B60R 21/2338* | (2011.01) |
| *B62D 1/19* | (2006.01) |
| *B62D 6/00* | (2006.01) |
| *B60R 21/00* | (2006.01) |

(52) U.S. Cl.
CPC ............ *B62D 1/183* (2013.01); *B60R 21/203* (2013.01); *B60R 21/2338* (2013.01); *B60R 21/264* (2013.01); *B62D 1/192* (2013.01); *B62D 6/00* (2013.01); *B60R 2021/0032* (2013.01)

(58) Field of Classification Search
CPC ....... B62D 1/183; B62D 1/192; B60R 21/203; B60R 21/2338; B60R 21/264
See application file for complete search history.

(56) References Cited

U.S. PATENT DOCUMENTS

| | | | | |
|---|---|---|---|---|
| 5,295,712 | A * | 3/1994 | Omura | B60R 21/203 280/731 |
| 6,170,862 | B1 * | 1/2001 | Hoagland | B60R 21/2032 280/731 |
| 6,227,571 | B1 * | 5/2001 | Sheng | B62D 1/197 280/731 |
| 8,899,623 | B2 * | 12/2014 | Stadler | B62D 1/192 280/731 |
| 9,108,584 | B2 * | 8/2015 | Rao | B60R 21/017 |
| 2007/0046013 | A1 * | 3/2007 | Bito | B60R 21/203 280/777 |

* cited by examiner

*Primary Examiner* — Faye M Fleming
(74) *Attorney, Agent, or Firm* — Cantor Colburn LLP

(57) ABSTRACT

A steering column system includes a steering column shaft, a steering input device coupled to the steering column shaft, a column adjustment assembly configured to translate the steering column shaft between a retracted position and a driving position, and, an air bag operatively arranged with the steering input device, the air bag deployable to one of a first size and a second size, the second size greater than the first size. When the steering column shaft is in the driving position, the air bag is deployable to the first size, and when the steering column shaft is in the retracted position, the air bag is deployable to the second size.

20 Claims, 4 Drawing Sheets

RETRACTABLE STEERING COLUMN SYSTEM WITH AIR BAG, VEHICLE HAVING THE SAME, AND METHOD

CROSS-REFERENCES TO RELATED APPLICATIONS

This patent application claims priority to U.S. Provisional Patent Application Ser. No. 62/184,357, filed Jun. 25, 2015 which is incorporated herein by reference in its entirety.

FIELD OF THE INVENTION

The following description relates to steering column assemblies and, more specifically, to a retractable steering column assembly having an air bag.

BACKGROUND

Vehicle steering wheels are typically used to steer a vehicle. When a vehicle is equipped with an autonomous driving assist steering ("ADAS") system, the steering wheel does not need to rotate as the self-driving system turns the road wheels. This non-rotation allows the steering column and wheel to have another use or purpose.

Accordingly, it is desirable to provide a steering column assembly that enables the driver to manipulate the position or purpose of the steering wheel while still providing driver protection.

SUMMARY OF THE INVENTION

In one embodiment of the present disclosure, a steering column system includes a steering column shaft, a steering input device coupled to the steering column shaft, a column adjustment assembly configured to translate the steering column shaft between a retracted position and a driving position, and, an air bag operatively arranged with the steering input device, the air bag deployable to one of a first size and a second size, the second size greater than the first size. When the steering column shaft is in the driving position, the air bag is deployable to the first size, and when the steering column shaft is in the retracted position, the air bag is deployable to the second size.

In another embodiment of the present disclosure, a vehicle includes a steering column shaft, a steering input device coupled to the steering column shaft, a column adjustment assembly configured to translate the steering column shaft between a retracted position and a driving position, and, an air bag operatively arranged with the steering input device, the air bag deployable to one of a first size and a second size, the second size greater than the first size. When the steering column shaft is in the driving position, the air bag is deployable to the first size, and when the steering column shaft is in the retracted position, the air bag is deployable to the second size.

In yet another embodiment of the present invention, a method of operating a steering column assembly of a vehicle includes translating a steering column shaft to one of a retracted position and a driving position, a steering input device coupled to the steering column shaft, and an air bag operatively arranged with the steering input device, the air bag deployable to a first size and a second size, the second size greater than the first size; and, upon experiencing a crash event, deploying the air bag to the second size when the steering column shaft is in the retracted position, and deploying the air bag to the first size when the steering column shaft is in the driving position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
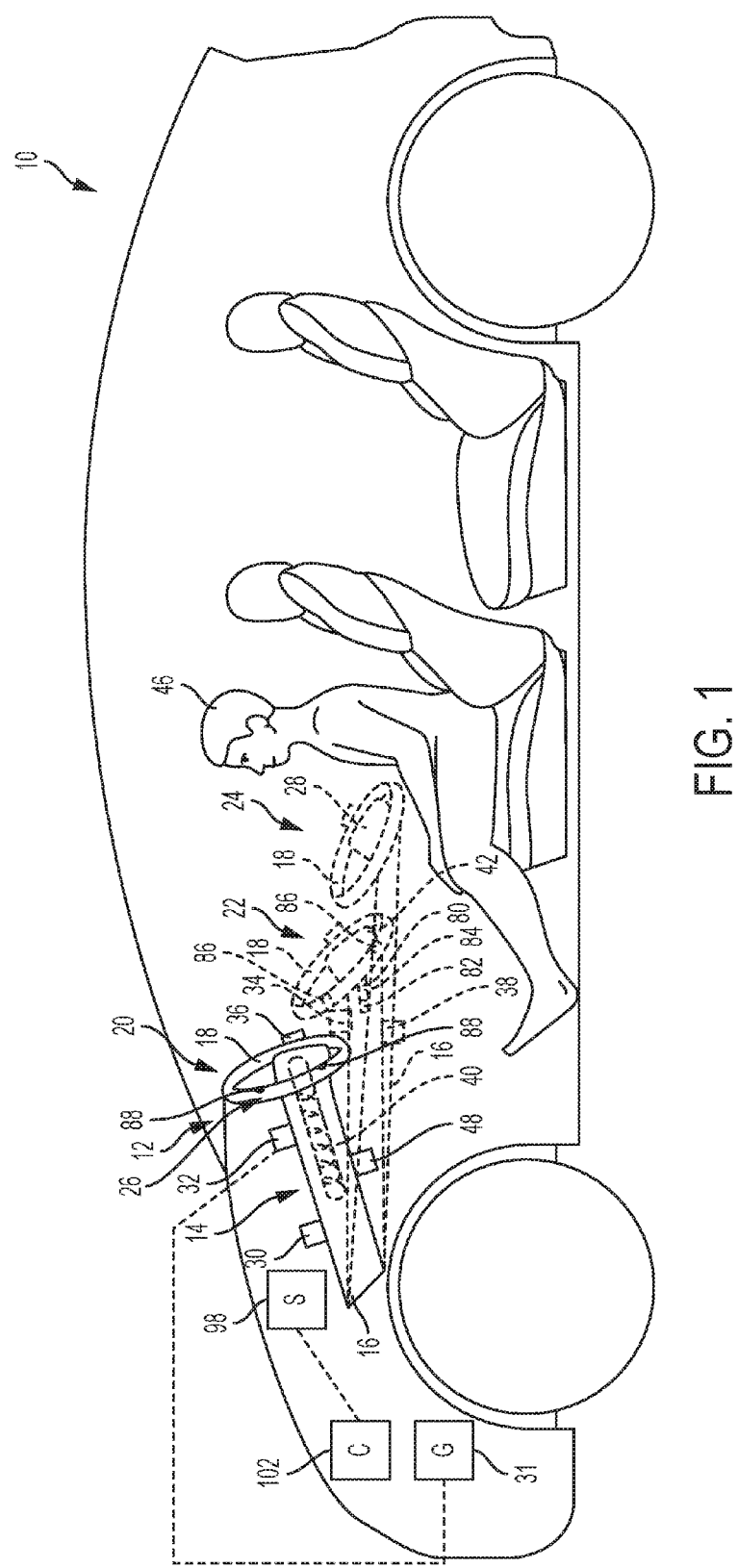
FIG. 1 is a schematic view of a vehicle and steering column assembly according to one embodiment of the disclosure.

Referring now to the Figures, where embodiments will be described, without limiting same, FIG. 1 illustrates an embodiment of a vehicle 10, such as an autonomous driving assisted steering ("ADAS") equipped vehicle, generally having an instrument panel 12 and a retractable steering column assembly 14. Steering column assembly 14 generally includes a steering column shaft 16 and a steering input device, such as steering wheel 18, coupled thereto.

In the exemplary embodiment, steering column assembly 14 is movable between a retracted position 20, a deployed or driving position 22, and an accessory or utility position 24. The steering wheel 18 is positioned closer to the driver 46 in the driving position 22 than in the retracted position 20. Also, the steering wheel 18 is distanced further from the instrument panel 12 in the driving position 22 than in the retracted position 20. In the retracted position 20, portions of assembly 14 such as steering wheel 18 are disposed away from the driver 46 toward or into instrument panel 12, which provides increased space for the driver 46. In the illustrated embodiment, instrument panel 12 includes one or more receiving compartments or areas 26 to receive some or all of steering column assembly 14. For example, receiving area 26 may be configured to receive steering wheel 18 such that wheel 18 and thus assembly 14 may be retracted within and flush with instrument panel 12 in the retracted position 20. The displacement of the steering column shaft 16 and wheel 18 in retracted position 20 creates additional cabin space for the driver's comfort and convenience to perform non-driving activities including, but not limited to, reading, working, entertaining, eating, texting, etc.

In the driving position 22, steering wheel 18 may be used by a driver 46 to steer the vehicle 10. While only one driving position 22 is shown, a plurality of driving positions 22 may be utilized to comfortably accommodate different drivers 46. In the accessory position 24, portions of assembly 14 such as steering wheel 18 may be used for non-driving activities such as reading, working, or other forms of entertainment. As such, at least a portion of steering wheel 18 is configured to be non-rotatable such that objects like computers or books may be rested thereupon. For example, a tray table or work surface 28 may be coupled to or integrated with steering wheel 18 to enable such activities. Alternatively, only a rim or hub of the steering wheel 18 is non-rotatable and includes attachments such as hooks to support work surface 28. In other embodiments, an electronic device or the like, such as but not limited to a tablet, is integrated into the stationary wheel 18 or work surface 28.

In one embodiment, steering column assembly 14 may further include a steering column adjustment assembly 30, a decoupling assembly 32, a torque interface assembly 34, one or more sensors 36, reversible lock 38, and extension detection device 48. Each of assemblies 30, 32, 34, sensors 36, lock 38, and device 48 are associated with the steering column assembly 14 in each position 20, 22, 24, however, for clarity, one or more of the assemblies 30, 32, 34, sensors 36, lock 38, and device 48 are not depicted in each position 20, 22, 24. Further, any two or more of the assemblies 30, 32, 34, sensors 36, lock 38, and device 48 may be combined into a single system for use with the steering column assembly 14. Adjustment assembly 30 is configured to move steering column assembly 14 for driver comfort (e.g., telescope or rake adjustment) and to move assembly 14 between the retracted position 20 and the driving position 22. Adjustment assembly 30 may include one or more mechanical/electrical mechanisms such as a motor. Adjustment assembly 30 may also include a retraction mechanism that enables a driver 46 to mechanically, electronically, or manually return steering wheel 18 from the retracted position 20 to the driving position 22. The adjustment assembly 30 may further include electrical actuators that move the steering column shaft 16 and steering wheel 18 fore and aft.

In one embodiment, decoupling assembly 32 is configured to selectively decouple one or more portions of assembly 14 (e.g., shaft 16) from a vehicle steering gear 31 such that steering wheel 18 is in a non-rotatable mode. This decoupling assembly 32 may be mechanically or electrically activatable by a clutch, or by steer-by-wire, or counter-rotated by a servo-actuator, for example. Alternatively or additionally, assembly 32 may provide a counter rotation to wheel 18 to counteract any rotation of wheel 18 caused by the ADAS system 98 such that wheel 18 functions and appears as non-rotatable.

Further, the decoupling assembly 32 allows the steering column shaft 16 and wheel 18 to be displaced forward in the vehicle 10 to the retracted position 20 because the steering wheel 18 is no longer being used by the driver 46 to guide the vehicle 10. The retracting action may be accomplished by the steering column adjustment assembly 30, which may include long stroke, electrical actuators responding to the driver's intention through a switch and motor controller, or by the driver 46 manually releasing a clamp and pushing the steering wheel 18 and steering column shaft 16 forward to the retracted position 20. In any case, the embodiments described herein make retraction of the steering column shaft 16 and wheel 18 away from the driver 46 possible in order to provide space for non-driving related activities such as working, reading, and game playing. In the retracted position 20, the steering wheel 18 is a preset distance beyond a normal ergonomic range from the driving position 22. The steering wheel 18 may, for example but not by limitation, be approximately 100 mm forward of the driver's normal driving position 22. The decoupling assembly 32 may also be used to re-couple one or more portions of assembly 14 (e.g., shaft 16) to the vehicle steering gear 31 when the shaft 16 and wheel 18 are in the driving position 22 such that the steering wheel 18 is again usable by the driver 46 to guide the vehicle 10, however the decoupling assembly 32 decouples the one or more portions of assembly 14 (e.g., shaft 16) from the vehicle steering gear 31 when the shaft 16 and wheel 18 are in the retracted position 20 or utility position 24.

In one embodiment, torque interface assembly 34 is configured to detect and monitor driver torque input (rotational and translational) to steering wheel 18, for example, to determine if the driver 46 is in control of the vehicle 10. As further shown in FIG. 1, sensors 36 are configured to detect and monitor driver compartment conditions, the driver's condition, the vehicle environment, and/or the vehicle control systems. For example, sensors 36 may: detect objects between the retracted steering wheel 18 and the driver 46 that may cause an unsafe situation for the driver 46 to safely retake control of the vehicle 10; detect if the driver 46 is not in a position to safely retake control of the vehicle 10; and/or detect undesirable vehicle dynamics that require the driver 46 to retake control of the vehicle 10. Whether in the retracted position 20, the deployed/driving position 22, or the accessory/utility position 24, the fore-aft position of the steering column shaft 16 and wheel 18 is known by the ADAS system 98 by detected data from one or more of the torque interface assembly 34, the sensors 36, and extension detection device 48, which may be positioned on the steering column shaft 16 or wheel 18. The extension detection device 48 may be incorporated into the steering column adjustment assembly 30. A controller 102 of the ADAS system 98 may receive signals from each of the monitored systems and sensors. Sensors may include, but are not limited to switches and potentiometers.

The retracting process of moving the steering column shaft 16 and wheel 18 from the driving position 22 (or accessory/utility position 24) to the retracted position 20 must eventually be reversed to return steering control of the vehicle 10 to the driver 46. In the event that the driver 46 wishes to disengage the self-driving feature, the driver 46 may alert the ADAS system 98 of the desire to self-steer by gripping sensors on the wheel 18, applying steering torque to the wheel 18, or other sensory means that communicates the intention to take over driving the vehicle 10. That is, the driver 46 should be able to reach forward, grip the wheel 18, and be able to relatively quickly bring the wheel 18 to the driving position 22 to resume steering of the vehicle 10. When returned to the driving position 22, the steering column 16 and steering wheel 18 are fixed, at least temporarily, such as by the decoupling assembly 32 and/or the deactivatable, reversible lock 38, in that fore-aft position of the driving position 20. When fixed in the driving position 20, the vehicle 10 provides the ability to reduce the driver's kinetic energy, such as may result from a crash, via an energy absorbing mechanism 40 in the steering column shaft 16, the deformation of the steering wheel 18, and the deployment of the driver's air bag 42. However, if the steering wheel 18 and the air bag 42 are distanced from the driver 46 in the retracted position 20, then the air bag 42 may not be ideally situated for driver protection in the event of a crash, and deployment of the air bag 42 during a crash may not be an effective injury reducing device, as it may be too far from the driver's torso to effectively spread the force of the crash or reduce the driver's kinetic energy by deforming and doing work. Thus, in accordance with embodiments of this disclosure, when the steering column shaft 16 and the steering wheel 18 are retracted away from the normal driving position 22, then provisions are put in place to ensure driver protection.

Figure 2A:
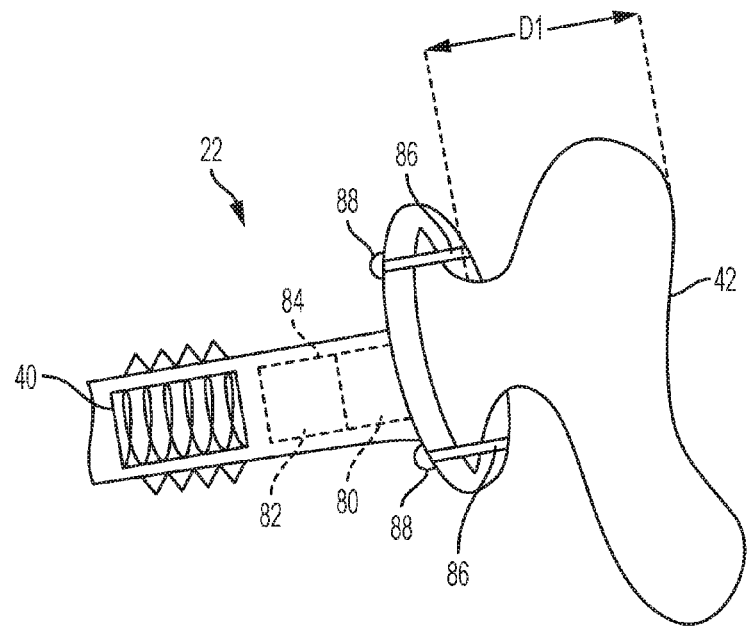
FIGS. 2A and 2B are schematic views of a steering column assembly and inflated air bag in a driving position and a retracted position, respectively, according to one embodiment of the disclosure; and, FIGS. 3A and 3B show a flowchart demonstrating an operation of the vehicle and steering column assembly according to one embodiment of the disclosure.
Figure 2B:
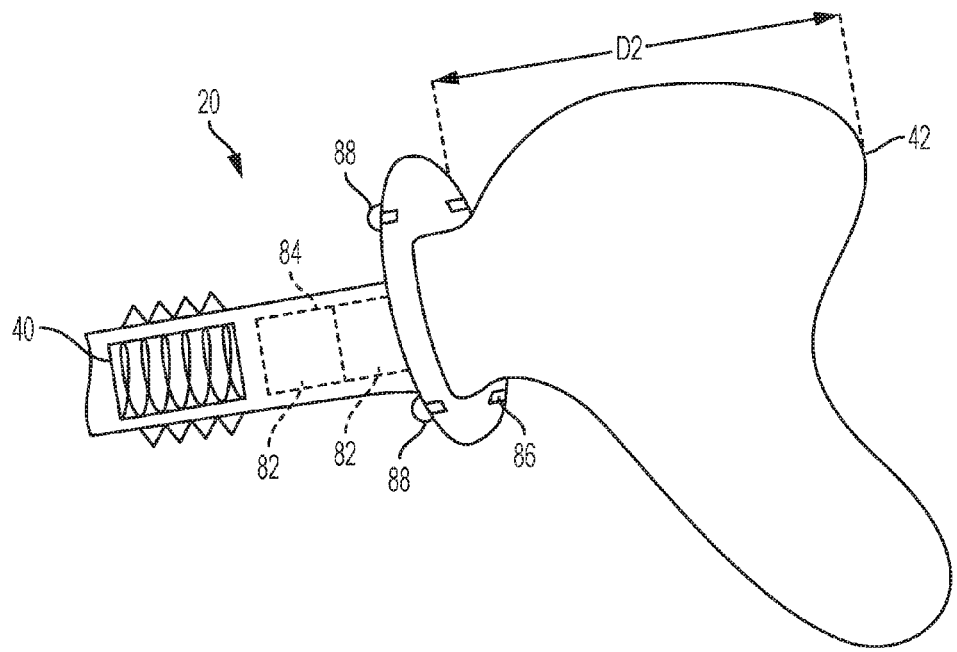

In one embodiment, as shown in FIG. 1 and FIGS. 2A and 2B, the driver's side air bag 42 is operatively configured to include a plurality of inflation volumes adapted to the fore-aft position of the steering column shaft 16 and steering wheel 18. For example, as shown in FIG. 2A, in the driving position 22 of the steering wheel 18, in response to a crash event, a first inflation volume of the driver's side air bag 42 will inflate in customary fashion using a first amount of gas generation material 80, such as contained in canister 84 located in a hub of the wheel 18 under the folded air bag 42. However, as shown in FIG. 2B, in a second position of the steering wheel 18, such as, but not limited to, the retracted position 20, a second inflation volume of the driver's side air bag 42 will inflate, in response to a crash event, using a second amount of gas generation material 82, which may also be contained in the canister 84 or in a separate canister. The first and second amounts of gas generation material 80, 82 may be combined to inflate the air bag 42 to the second size, or alternatively an entirely different source of gas generation material may be utilized which contains the needed amount of gas to fill the air bag 42 to the second size. The second inflation volume is greater than the first inflation volume to accommodate for the increased distance between the steering wheel 18 and the driver 46. That is, the distance D2 that the air bag 42 is extendable is greater when the steering column assembly 14 is in the retracted position 20 than the distance D1 that the air bag 42 is extendable when the steering column assembly 14 is in the driving position 22. The additional, greater capacity of gas generation is used to cause the proper gas pressure in the air bag 42 which is larger in volume when the steering wheel 18 is displaced from the driving position 22, such as in the retracted position 20.

The driver's side air bag 42 thus has two levels of inflatable volume. A first size includes the first volume required for inflation in a crash event when the steering column shaft 16 is in the driving position 22. The first size and shape of the air bag 42 may be maintained by one or more tethers 86 that inhibit expansion to a greater second size of the air bag 42. The second size and volume of the air bag 42 is enabled when a crash event occurs with the steering column shaft 16 in the retracted position 20. The shape of the air bag 42 having the second size and volume is designed to extend the additional distance (D2 minus D1) towards the driver 46 between the retracted position 20 and the driving position 22. One or more tether releasers 88 are used to sever, cut, remove, or otherwise release the tethers 86 upon indication of a crash event, such as immediately after an inflatable restraint logic controller signals its need. Releasing the tethers 86 allows one or more additional compartments of the bag 42 to be inflated, such that the bag 42 will have the second size and volume in a crash event when the steering column assembly 14 is in the retracted position 20, as shown in FIG. 2B where tethers 86 have released the additional material of the air bag 42. Signals may also be provided to release the second amount of gas generation material 82 (in addition to the first amount of gas generation material 80) to the air bag 42. In one non-limiting embodiment, the tether releasers 88 may include pyrotechnic tether cutters. In another non-limiting embodiment, the tether releasers 88 may include a releasing device which releases the tethers 86 via an end of the tethers 86 being first assembled inside an inflator module, such that when the inflator module is energized, the end of the tethers 86 are released. Release of the tethers 86 enables the air bag 42 to inflate the second volume to expand the air bag 42 to the second size using the first and second amounts of gas generation material 80, 82. The tether releasers 88 are deactivated when the steering column assembly 14 is in the driving position 20.

Thus, the forces caused by the driver's torso impacting the air bag 42 extended to the second size are then available to engage two other energy absorbing devices that would be otherwise unavailable in the retracted position 20. The deformation of the steering wheel 18 and the stroking of the energy absorbing mechanism 40 in the steering column shaft 16 can additionally operate to reduce the driver's kinetic energy, even when the steering column assembly 14 is in the retracted position 20.

Figure 3A:
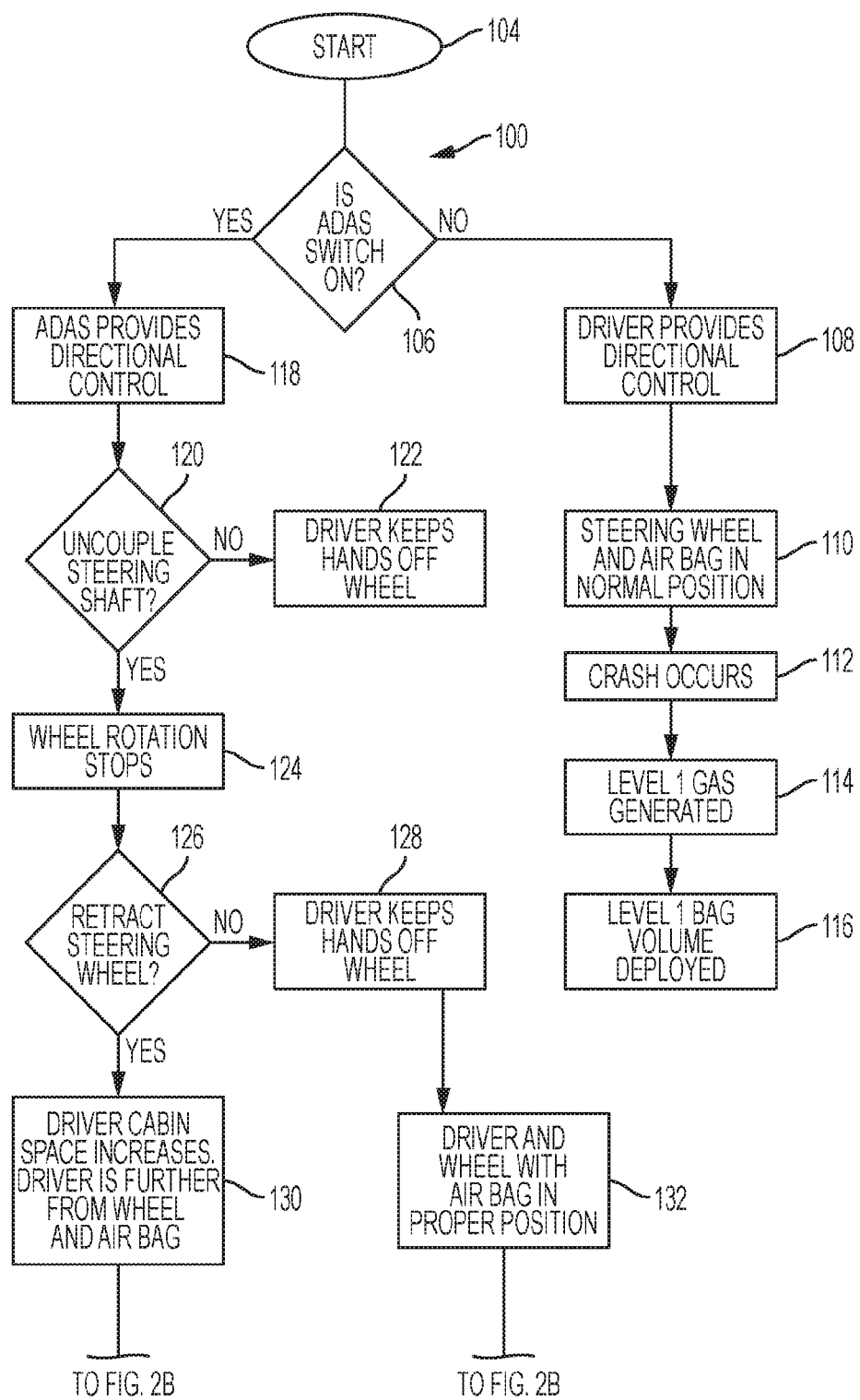
Figure 3B:
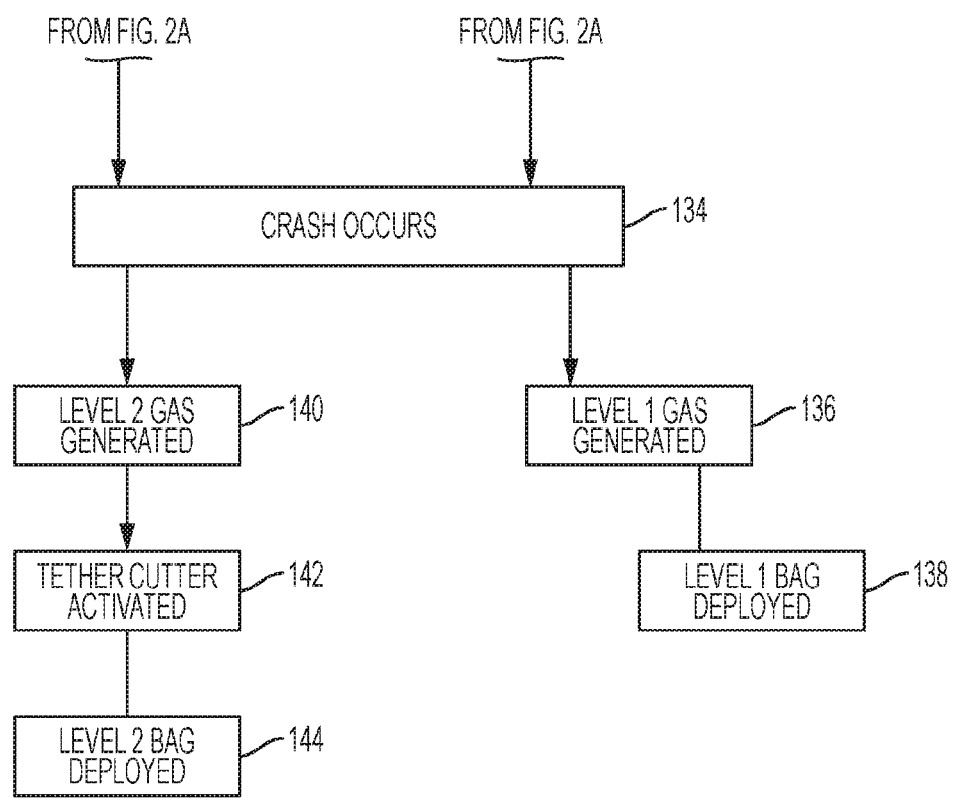

An embodiment of an operation 100 of the retractable steering column system with airbag 42 is depicted in FIGS. 3A and 3B. A start 104 of the operation 100, as shown in FIG. 3A, may be assessed by a controller 102 of the ADAS system 98, shown diagrammatically in FIG. 1. The controller 102 may receive information (signal(s)) from, but not limited to, one or more of the steering column adjustment assembly 30, decoupling assembly 32, torque interface assembly 34, sensors 36, reversible lock 38, extension detection device 48, as well as any other feature within the vehicle 10 that is communicable with the controller 102. The operation 100 will determine, as demonstrated by block 106, whether an ADAS switch of the ADAS system 98 is on. When the ADAS switch is not on, then, as demonstrated by block 108, a driver 46 may provide directional control. The steering wheel 18 and thus air bag 42 are in a normal position, the driving position 22, as demonstrated by block 110. Thus, if a crash event occurs, as demonstrated by block 112, a first amount of gas generation material 80 is utilized and the first volume of the air bag 42 is filled with the first amount of gas generation material 80, as demonstrated by blocks 114 and 116, and as depicted in FIG. 2A. The air bag 42 is restricted to the first size by the tethers 86, which are not released when the steering column 16 is in the driving position 22.

However, when it is determined at block 106 that the ADAS switch is on, then, as demonstrated by block 118, the ADAS system 98 may provide directional control. The controller 102 further determines, as demonstrated by block 120, if the steering column shaft 16 has been decoupled yet, such as by decoupling assembly 32. If not, then as demonstrated by block 122, the driver 46 keeps hands off the steering wheel 18. If the steering column shaft 16 is decoupled, then as demonstrated by block 124, rotation of steering wheel 18 is stopped.

At some point during the operation 100, a driver 46 may wish to retract the steering wheel 18 away from the driving position 22. The controller 102 will determine, such as via receipt of a signal, as demonstrated by block 126, if the column shaft 16 and wheel 18 are retracted during the retracting operation to position 20. If not, then as demonstrated by block 128, the driver 46 will keep hands off the steering wheel 18, and the driver 46 will be a first distance (a customary distance) from steering wheel 18 and air bag 42, as noted by block 132. However, if the steering column shaft 16 and wheel 18 are retracted, then as demonstrated by block 130, driver cabin space within the vehicle 10 is enlarged, but the driver 46 is a second distance greater than the first distance from the steering wheel 18 and air bag 42.

Block 134 in FIG. 3B demonstrates that a crash event has occurred. When the driver 46 and wheel 18 are the first distance apart as noted in block 132, then the first amount of gas generation material 80 will be expelled into the air bag 42 as demonstrated by block 136, and the air bag 42 having the first size will be deployed as demonstrated by block 138, and as shown in FIG. 2A. When the driver 46 and wheel 18 are the second distance apart as noted in block 130, then the second amount of gas generation material 82 will be expelled into the air bag 42 in addition to the first amount of gas generation material 80 (or alternatively an entirely different source of gas generation material is utilized which contains the needed amount of gas to fill the air bag 42 to the second size), as demonstrated by block 140 and as shown in FIG. 2B. The tether releaser(s) 88 are activated to release the tethers 86 as demonstrated by block 142, and the air bag 42 having the second size will be deployed as demonstrated by block 144 and as shown in FIG. 2B.

Thus, embodiments of a retractable steering column system have been described which enables use of an air bag within the steering wheel to be useful for driver protection in both the driving position and the retracted position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column system comprising:
   a steering column shaft;
   a steering input device coupled to the steering column shaft;
   a column adjustment assembly configured to translate the steering column shaft between a retracted position and a driving position;
   an air bag operatively arranged with the steering input device, the air bag deployable to one of a first size and a second size, the second size greater than the first size; and
   when the steering column shaft is in the driving position, the air bag is deployable to the first size, and when the steering column shaft is in the retracted position, the air bag is deployable to the second size.

2. The steering column system of claim 1, further comprising a first amount of gas generation material releasable to the air bag when the steering column shaft is in the driving position, and a second amount of gas generation material releasable to the air bag when the steering column shaft is in the retracted position, wherein a total amount of gas generation material releasable to the air bag when the steering column shaft is in the retracted position is greater than the first amount of gas generation material.

3. The steering column system of claim 1, further comprising at least one tether configured to restrict a size of the air bag to the first size when the steering column shaft is in the driving position.

4. The steering column system of claim 3, further comprising at least one tether releaser activatable in a crash event when the steering column shaft is in the retracted position, and deactivated in a crash event when the steering column shaft is in the driving position.

5. The steering column system of claim 4, wherein the at least one tether releaser is a cutter.

6. The steering column system of claim 5, wherein the cutter is a pyrotechnic cutter.

7. The steering column system of claim 4, wherein the at least one tether releaser includes an inflator module activatable to release at least one portion of the at least one tether.

8. The steering column system of claim 1, wherein a fore-aft size difference between the first size and the second size of the air bag is approximately equal to a fore-aft distance between the retracted position of the steering input device and the driving position of the steering input device.

9. The steering column system of claim 1, further comprising a decoupling assembly configured to decouple the steering input device from a steering gear.

10. The steering column assembly of claim 1, further comprising a torque interface assembly configured to detect a torque input into the steering input device.

11. The steering column assembly of claim 1, further comprising at least one sensor configured to monitor at least one of driver compartment conditions, a driver's condition, a vehicle environment, and a vehicle control system.

12. The steering column assembly of claim 1, wherein at least a portion of the steering input device is non-rotatable.

13. The steering column assembly of claim 12, further comprising a work surface coupled to or integrated with the steering input device.

14. The steering column system of claim 1, further comprising a steering column energy absorbing mechanism.

15. A vehicle comprising:
   a steering column shaft;
   a steering input device coupled to the steering column shaft;
   a column adjustment assembly configured to translate the steering column shaft between a retracted position and a driving position;
   an air bag operatively arranged with the steering input device, the air bag deployable to one of a first size and a second size, the second size greater than the first size;
   when the steering column shaft is in the driving position, the air bag is deployable to the first size, and when the steering column shaft is in the retracted position, the air bag is deployable to the second size.

16. The vehicle of claim 15, further comprising an autonomous driving assisted steering system, wherein the steering input device is not connected to a steering gear in the retracted position, and the autonomous driving assisted steering system provides directional control in the retracted position of the steering column shaft.

17. The vehicle of claim 15, further comprising an instrument panel including at least one receiving compartment configured to receive at least a portion of the steering column assembly when the steering column assembly is in the retracted position.

18. A method of operating a steering column assembly of a vehicle, the method comprising:
   translating a steering column shaft to one of a retracted position and a driving position, a steering input device coupled to the steering column shaft, and an air bag operatively arranged with the steering input device, the air bag deployable to a first size and a second size, the second size greater than the first size; and,
   deploying the air bag to the second size upon a crash event when the steering column shaft is in the retracted position, and deploying the air bag to the first size upon a crash event when the steering column shaft is in the driving position.

19. The method of claim 18, wherein deploying the air bag to the first size includes restricting the air bag from inflating to the second size, and deploying the air bag to the second size includes expanding at least one additional compartment area of the air bag to inflate to the second size.

20. The method of claim 19, wherein restricting the air bag from inflating to the second size includes retaining at least one tether on the air bag, and expanding at least one additional compartment area of the air bag includes releasing at least one tether from the air bag.

* * * * *